(12) United States Patent
Harding et al.

(10) Patent No.: US 9,124,631 B2
(45) Date of Patent: Sep. 1, 2015

(54) CONTENT SYNDICATION IN WEB-BASED MEDIA VIA AD TAGGING

(75) Inventors: John M. Harding, San Francisco, CA (US); Jeremy Doig, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 728 days.

(21) Appl. No.: 12/643,589

(22) Filed: Dec. 21, 2009

(65) Prior Publication Data

US 2010/0287580 A1     Nov. 11, 2010

Related U.S. Application Data

(60) Provisional application No. 61/176,762, filed on May 8, 2009.

(51) Int. Cl.
| | | |
|---|---|---|
| H04H 60/32 | (2008.01) | |
| H04N 7/10 | (2006.01) | |
| H04L 29/08 | (2006.01) | |
| H04N 21/458 | (2011.01) | |
| H04N 21/234 | (2011.01) | |
| G06Q 30/02 | (2012.01) | |
| H04N 21/235 | (2011.01) | |
| H04N 21/44 | (2011.01) | |
| H04N 21/81 | (2011.01) | |
| H04N 21/845 | (2011.01) | |
| H04L 29/06 | (2006.01) | |

(52) U.S. Cl.
CPC ............ *H04L 67/20* (2013.01); *G06Q 30/0247* (2013.01); *G06Q 30/0255* (2013.01); *H04L 65/602* (2013.01); *H04L 65/607* (2013.01); *H04N 21/235* (2013.01); *H04N 21/23424* (2013.01); *H04N 21/44016* (2013.01); *H04N 21/458* (2013.01); *H04N 21/812* (2013.01); *H04N 21/8455* (2013.01)

(58) Field of Classification Search
CPC .................... H04N 21/23424; H04N 21/458
USPC ..................................... 725/14, 32
See application file for complete search history.

(56) References Cited

U.S. PATENT DOCUMENTS

| | | | |
|---|---|---|---|
| 7,627,878 B2 * | 12/2009 | Pouliot et al. ............... | 725/22 |
| 8,185,923 B2 * | 5/2012 | Slaney et al. ............... | 725/34 |
| 8,571,934 B2 | 10/2013 | Rosenberg et al. | |
| 2002/0016736 A1 * | 2/2002 | Cannon et al. ............... | 705/14 |

(Continued)

FOREIGN PATENT DOCUMENTS

| | | |
|---|---|---|
| JP | 2001-291016 | 10/2001 |
| JP | 2002-366834 | 12/2002 |

(Continued)

OTHER PUBLICATIONS

Examiner's First Report on Australian Patent Application No. AU 2010245156 mailed Dec. 15, 2011, 3 Pages.

(Continued)

*Primary Examiner* — Pankaj Kumar
*Assistant Examiner* — Franklin Andramuno
(74) *Attorney, Agent, or Firm* — Fenwick & West LLP

(57) ABSTRACT

Methods and systems for providing advertisements for inclusion in video content. In one embodiment, a video is formatted into a specific format for advertising purposes. The format describes a standard for advertisement placement opportunities within a video in which a client device may select advertisements for display during these opportunities.

48 Claims, 6 Drawing Sheets

(56) References Cited

U.S. PATENT DOCUMENTS

| | | | |
|---|---|---|---|
| 2002/0046102 A1* | 4/2002 | Dohring et al. | 705/14 |
| 2002/0097235 A1 | 7/2002 | Rosenberg et al. | |
| 2002/0124251 A1* | 9/2002 | Hunter et al. | 725/32 |
| 2004/0022523 A1* | 2/2004 | Duerr et al. | 386/94 |
| 2004/0116183 A1 | 6/2004 | Prindle | |
| 2007/0078713 A1* | 4/2007 | Ott et al. | 705/14 |
| 2007/0157228 A1 | 7/2007 | Bayer et al. | |
| 2007/0198339 A1* | 8/2007 | Shen et al. | 705/14 |
| 2007/0283384 A1* | 12/2007 | Haeuser et al. | 725/34 |
| 2008/0066107 A1 | 3/2008 | Moonka et al. | |
| 2008/0109306 A1* | 5/2008 | Maigret et al. | 705/14 |
| 2008/0109309 A1* | 5/2008 | Landau et al. | 705/14 |
| 2008/0109376 A1* | 5/2008 | Walsh et al. | 705/80 |
| 2008/0109844 A1 | 5/2008 | Baldeschwieler et al. | |
| 2008/0114861 A1 | 5/2008 | Gildred | |
| 2008/0162693 A1* | 7/2008 | Kanojia et al. | 709/224 |
| 2008/0221989 A1* | 9/2008 | Messer et al. | 705/14 |
| 2008/0255943 A1* | 10/2008 | Morten et al. | 705/14 |
| 2008/0276270 A1* | 11/2008 | Kotaru et al. | 725/34 |
| 2008/0307454 A1 | 12/2008 | Ahanger et al. | |
| 2009/0076882 A1* | 3/2009 | Mei et al. | 705/10 |
| 2009/0094520 A1 | 4/2009 | Kulas | |
| 2009/0119169 A1 | 5/2009 | Chandratillake et al. | |
| 2009/0157502 A1* | 6/2009 | Cooper et al. | 705/14 |
| 2009/0171749 A1* | 7/2009 | Laruelle et al. | 705/10 |
| 2009/0187939 A1* | 7/2009 | Lajoie | 725/34 |
| 2010/0145763 A1* | 6/2010 | Swanson, Sr. | 705/10 |
| 2010/0269132 A1* | 10/2010 | Foti | 725/32 |

FOREIGN PATENT DOCUMENTS

| | | |
|---|---|---|
| JP | 2005-311810 A | 11/2005 |
| JP | 2005-346731 | 12/2005 |
| JP | 2007-183863 | 7/2007 |
| JP | 2008-125102 | 5/2008 |
| JP | 2008-537645 | 9/2008 |
| KR | 10-2006-0073412 | 6/2006 |
| WO | WO-2007/130681 A2 | 11/2007 |
| WO | WO 2008/016634 A2 | 2/2008 |
| WO | WO 2008/033944 A2 | 3/2008 |
| WO | WO 2009/014301 | 1/2009 |

OTHER PUBLICATIONS

PCT International Search Report and Written Opinion, PCT/US2010/029822, Jun. 7, 2010, 11 pages.
Office Action for Korean Patent Application No. 10-2011-7029147, Jul. 31, 2013, 13 Pages.
Office Action for Korean Patent Application No. 10-2011-7029147, Mar. 3, 2013, 14 Pages.
Office Action for Japanese Patent Application No. P2012-50982, Mar. 28, 2013, 6 Pages.
Final Rejection for Japanese Patent Application No. JP 2012-509820, Oct. 22, 2013, 6 Pages.
Office Action for Canadian Patent Application No. CA 2,760,800, Oct. 28, 2013, 3 Pages.
First Office Action for Chinese Patent Application No. CN 201080028113.2, Mar. 5, 2014, 32 Pages.
Notification of 2nd Office Action CN Application No. 201080028113.2, Nov. 3, 2014, 12 pages.
Supplementary European Search Report for EP Application No. 10772429.6 Dec. 2, 2014, 6 pages.
Notice of Grounds for Rejection for JP Patent Application No. P2014-030052, Feb. 3, 2015, 4 pages.

* cited by examiner

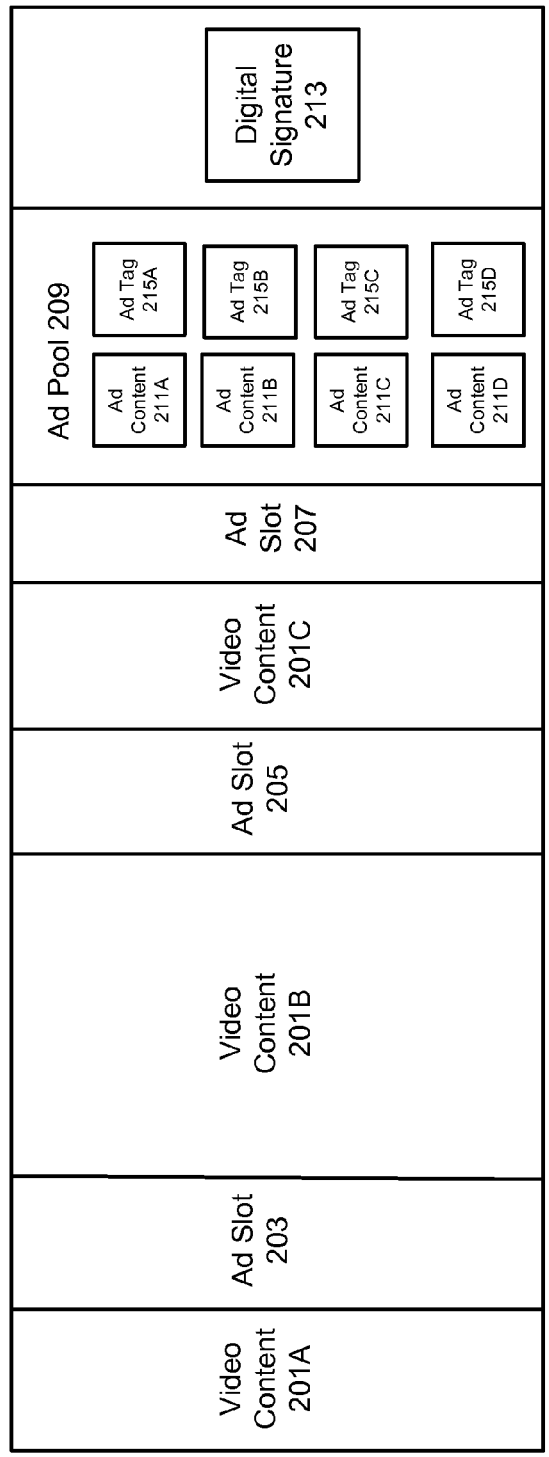
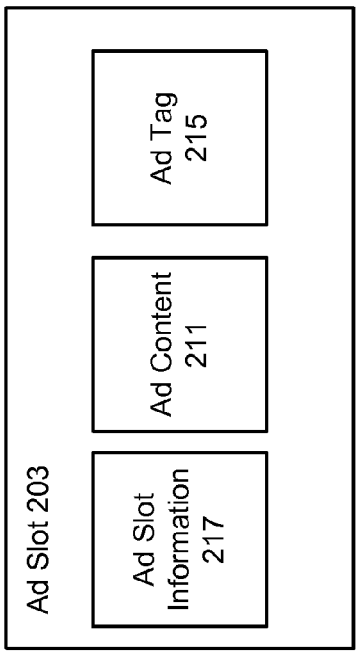
FIG. 2A
FIG. 2B

CONTENT SYNDICATION IN WEB-BASED MEDIA VIA AD TAGGING

CROSS REFERENCE TO RELATED APPLICATIONS

This application claims the benefit of U.S. Provisional Application No. 61/176,762, filed May 8, 2009, which is incorporated by reference in its entirety.

BACKGROUND

1. Field of Art

This disclosure generally relates to the field of providing advertisements in media content. Specifically, this disclosure is directed towards providing advertisements in videos via ad tagging to devices that typically operate for a period of time offline.

2. Description of the Related Art

Online sharing of video content has developed into a world-wide phenomenon, supported by dozens of websites. On average, many thousands of videos are posted every day, and this number is increasing as the tools and opportunities for capturing video become easier to use and more widespread. Shared video content provides good opportunities to present advertising material to viewers along with the requested video content. Such advertisements can generate revenue for content distributers, the video content publishers, or both.

When content distributers deliver video content to users in a web browser, the content distributers control the majority of the logic and the user interface for video playback. Conventional content distributers insert advertisements by using their own custom video player which is instructed to retrieve specific advertisements and insert the advertisements at specific times in the video content. Additionally, conventional content distributers can optionally embed advertisements directly into the video stream which eliminates the need to control the custom video player.

The control afforded to the content distributers allows for flexibility in advertisement insertion as the content distributers can select and display a new advertisement at each advertising opportunity within the content and have strict control over reporting of user viewing of advertisements for monetization purposes. Furthermore, the content distributers can support a wide variety of advertisement formats such as in-stream video advertisements, advertisement overlays (e.g., text, image and video overlays) as well as user interactive advertisements.

When videos are delivered to third party devices such as portable media players or television set top boxes, these devices typically do not support technologies that allow a content distributer tight control over the logic and user interface for video playback. Thus, content distributers do not know whether advertisements embedded within videos were viewed by users during video playback because of the lack of control. Additionally, third party devices typically are not configured to report user viewing of advertisements to the content distributers, which further compounds the problem faced by content distributers regarding advertisement viewing. Consequently, in environments where devices operate for a period of time offline, content providers cannot accurately control advertisement distribution and fail to fairly distribute payment for advertisement viewing due to the inconsistent reporting of user viewing of advertisements from varying devices.

SUMMARY

The present invention provides methods and systems for providing advertisements for inclusion in video content. In one embodiment, the video content is formatted into a specific video format conducive to advertising. This allows for control of advertisement distribution in compliant devices while the devices operate in a state with or without network connectivity. Additionally, the methods and systems allow for the receipt from the compliant devices accurate reports of user viewing of advertisements for monetization purposes when network connectivity is available.

In one embodiment, responsive to receiving video content that includes advertising opportunities defined by content publishers associated with the content, for each piece of video content a content distributor such as a video hosting website determines the advertising opportunities included within the piece of video content called advertisement slots. The content distributer may determine any initial advertisement content to be included in the advertisement slots that are located within the video content, either at the time of receipt of the video content, during serving of the content to a requesting user, or both. The advertisement content is determined based on advertising attributes associated with each advertisement slot. The advertisement content may also be received from an advertising service that provides the advertisement content.

The advertisement content generally includes an advertisement pool that comprises a plurality of advertisements in various formats from which a compliant device can choose from to include during playback of the video content. The advertisement pool allows the compliant device to vary advertisement playback within the video as the device operates either offline or when network connectivity is available. The content distributer inserts the advertisement content along with an advertisement tag for each advertisement into the video content. The advertisement tag comprises information needed by the compliant device to properly display the advertisement that the tag is associated with. Once the advertisement tags have been included in a piece of video content, the video content is in the appropriate format for advertisement purposes and can be served when requested for viewing by a user.

Alternatively, as noted above advertisement content may be determined when serving the video content to a user during query time. In one embodiment, unique advertisement tags are included in the video content at query time thereby providing different advertisement tags or advertisements each time the video content is served to a user.

In one embodiment, when network connectivity is available, a compliant device requests and receives video content from a content distributer that is delivered in the appropriate format for advertisement purposes. The compliant device may also be capable of requesting the initial advertisements for inclusion in the video or requesting advertisements to replace existing advertisements in the video. The user of the device disconnects from the network after the video content has been downloaded to the compliant device. While offline, the compliant device may display the video upon user request along with the advertisements in the video content. The advertisements are displayed according to the advertisement tags included with the video content. The compliant device logs user interaction with the advertisements and determines when network connectivity is available. At that time, the compliant device reports the user's interaction with the advertisements to the content distributer in order for the content distributer to determine compensation for the device manufacturer and/or the content publisher based on the user's interaction with the advertisements.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIG. 2A illustrates a high-level block diagram of a video format conducive for advertisement purposes according to one embodiment.

FIG. 2B illustrates a high-level block diagram of a detailed view of an ad slot according to one embodiment.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
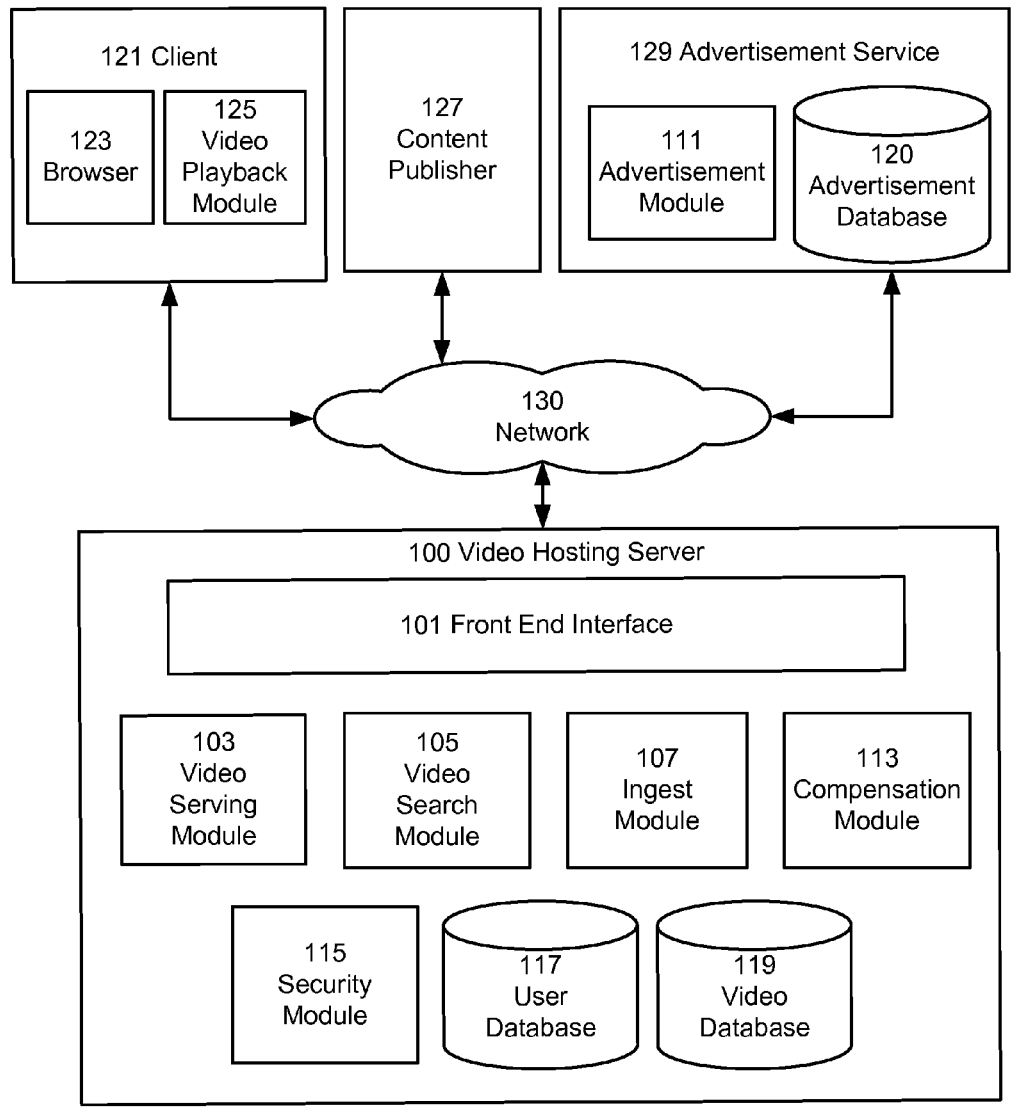
FIG. 1 illustrates a high-level block diagram of the computing environment according to one embodiment.

Referring now to FIG. 1, there is shown the system architecture of an embodiment of a video hosting server 100 in accordance with one embodiment of the present invention. As shown in FIG. 1, the video hosting server 100 comprises a front end interface 101, a video serving module 103, a video search module 105, an ingest module 107, a compensation module 113, a security module 115, a user database 117, and a video database 119. Many conventional features, such as firewalls, load balancers, application servers, failover servers, site management tools and so forth are not shown so as not to obscure the features of the system.

A suitable website for implementation of the video hosting server 100 is the YOUTUBE™ website, found at www.youtube.com; other video hosting sites are known as well, and can be adapted to operate according to the teaching disclosed herein. It will be understood that the term "web site" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting server 100 is implemented as server program executing on server-class computer comprising a CPU, memory, network interface, peripheral interfaces, and other well known components. The computers themselves preferably run an open-source operating system such as LINUX, have generally high performance CPUs, 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer-readable (accessible) storage mediums (e.g., RAM, hard disk, or optical/magnetic media).

In one embodiment, a client 121 executes a browser 123 or other apparatus for viewing content transmitted via the World Wide Web and can connect to the video hosting server 100 to view media content in a video player, which in different embodiments may be embedded in or external to the browser. The content, herein referred to as a "video," "video content" or "video items" is obtained via a network 130, which is typically the Internet, but can also be any network, including but not limited to any combination of a LAN, a MAN, a WAN, a mobile, wired or wireless network, a private network, or a virtual private network. In alternative embodiments, client 121 may retrieve content directly or indirectly from the video hosting server 100 through means other than the network. While only a single client 121 is shown, it is understood that very large numbers (e.g., millions) of clients are supported and can be in communication with the video hosting server 100 at any time.

The browser 123 can include any application that allows users of client 121 to access web pages on the World Wide Web. Suitable applications are Microsoft Internet Explorer, Netscape Navigator, Mozilla Firefox, Apple Safari, Google Chrome or any application adapted to allow access to web pages on the World Wide Web. The browser 123 can also include a video player (e.g., Flash™ from Adobe Systems, Inc.), or any other player adapted for the video file formats used in the video hosting server 100.

The browser 123 allows the user of the client 121 to access video content from the video hosting server 100 via a user interface provided by the front end interface 101. By loading the user interface in the browser 123, a user can then locate video content by browsing a catalog of website contents, conducting searches on keywords, reviewing content lists from other users or the system administrator (e.g., collections of videos forming channels), or viewing content associated with particular user groups (e.g., communities).

The browser 123 can also access a content file indirectly, for example, via an embedded video content that is accessed via an embedded hyperlink in a third party website. Note that in alternative embodiments the client 121 may not include a browser 123. Such clients 121 may include, for example, television set top boxes and portable media players.

Users can also search for video content on the user interface based on keywords, tags or other metadata. In one embodiment, these requests are received as queries in the user interface provided by the front end interface 101 and provided to the video search module 105, which searches the video database 119 for video content that satisfy the queries. The video search module 105 supports searching on any fielded data for video content, including its title, description, tags, author, category, comment, and so forth. The video serving module 103 retrieves videos selected by the video search module 105 from the video database 119, which is formatted into a file for transmission to the client 121. In one embodiment, formatting a video includes the video serving module 103 inserting advertisements and associated information into videos for display at client 121.

In one embodiment, the client 121 further comprises a video playback module 125. The video playback module 125 receives advertisements from the advertisement service 129 for insertion into a video according to one embodiment. Additionally, the video playback module 125 monitors user interactions with advertisements within videos during video playback for reporting purposes. The video playback module 125 sends the advertisement interaction information to the video hosting server 100 and/or the advertisement service 129, which is further described below, to determine distribution of revenue generated from the displayed advertisements. The video playback module 125 will be further described in greater detail in FIG. 3.

The client 121 may include a variety of different computing devices. Examples of client devices 121 are personal computers, net book computers, digital assistants, personal digital assistants, cellular phones, smart phones, network-connected phones, digital video recorders, mobile phones, television set top boxes or laptop computers. As will be obvious to one of ordinary skill in the art, the present invention is not limited to the devices listed above.

In some embodiments, clients 121 are devices that are capable of operating offline. In other embodiments, clients 121 are always online and able to connect to the video hosting server 100 and/or advertisement service 129. In one embodiment, offline operation is with respect to a client 121 lacking connectivity to the video hosting server 100 and/or advertisement service 129. While a client 121 may still have connectivity to a voice cellular network in the case of cellular phone, if the client 121 is not connected to the video hosting server 100 and/or the advertisement service 129 then the client 121 is considered to be operating offline. More generally, a client 121 may be operating offline if network connectivity is unavailable which does not allow connectivity to the video hosting server 100 and/or the advertisement service 129.

These client devices are capable of connecting to the video hosting server 100 via the network 130 when network connectivity is available, but also operate offline for a period of time when network connectivity is not available. For example, clients 121 include personal computers, portable media players or set top boxes that download media when connection to network 130 is available and are configured to display the media regardless of network connectivity. Clients 121 may also play back media in streaming fashion. Additionally, the devices may not have network access themselves, but instead send and receive data through applications when connected to a personal computer. An example of such device are traditional portable media devices that send and receive data through software applications located on a computer when connected to that computer. In one embodiment, we describe two types of client devices: a compliant client device and a non-compliant client device.

A compliant client device is any device that is configured by the manufacturer of the device to display advertisements according to the advertising format of received videos and to report online and/or offline playback of advertisements within videos according to a basic set of reporting requirements to the video hosting server 100 when network connectivity becomes available. An incentive for manufacturers to configure devices to report advertisement playback is that the manufacturers of the compliant devices may receive a share of the revenue generated by the displayed advertisements. Subsequent references here to a client 121 will refer to a compliant device unless otherwise specified.

Due to the broad range of advertisement formats available, compliant devices must support playback of various types of advertisement formats such as in-stream video advertisements. An in-stream video advertisement may be inserted directly into the video streams and audio streams of the video or as a separate track in a multi-track container. In-stream video advertisements typically are displayed after the original video is paused. Once the display of the advertisement has completed, the video is resumed. For example, thirty seconds into a video, the video itself may be automatically paused so that a video advertisement can be displayed. Once the in-stream video advertisement is finished playing, the original video continues to play. In-stream video advertisements may be displayed pre-display, mid-display or post-display (also sometimes referred to as pre-roll, mid-roll or post-roll) of the original video. In one embodiment, compliant offline device are configured to allow a user to skip playback of in-stream video advertisements.

Compliant devices also support static image advertisements. Static image advertisements are embedded into video content as one or more video frames depending on whether the video is played at a variable frame rate. Similar to in-stream video advertisements, the video being viewed is automatically paused such that a still image of an advertisement is displayed for a length of time before the video can resume being played. Viewing of static image advertisements can also be skipped if desired by the user of the compliant device.

An additional advertisement format that may be optionally supported by an compliant device includes overlay advertisement formats of text, images, video or a combination thereof. An overlay advertisement may be included in a video via various overlay mechanisms including overlaying the advertisement on top of the video content frame. For example, an advertisement may be overlaid in low-interest areas of video, such as a wall, such that the advertisement minimizes the disruption to the user caused by the advertisement. Overlay advertisements may also be included in a video by compressing the content video frame and displaying the advertisement in the remainder of the video frame. For example, a content video frame that displays a video may be compressed to 80 percent of the entire viewable area allowing for 20 percent of the viewable area to comprise a blank region in which the overlay advertisement may be included. Overlay advertisements can also be skipped if desired by the user viewing the advertisement.

Another additional advertisement that may be optionally supported by an compliant device includes interactive advertisements. Interactive advertisements include some level of user interaction with the displayed advertisements other than the user simply viewing the advertisement. Interactive advertisements can be built upon the other advertisement formats disclosed above by including a call to action in the advertisement which involves the user interacting with the advertisement in some manner. For example, the advertisement may include a hyperlink which the user must click to view additional information about the advertisement or the user may be required to enter information into the advertisement in order to receive additional content related to the advertisement.

Generally during video playback, a compliant device is provided at least one advertisement type which the device can support, e.g., in-stream advertisements. This allows for the device to always display at least one format of advertisement. Alternatively, a compliant device need not support the various advertisement types discussed above. These devices are considered compliant as long as the devices report whether advertisements were displayed regardless of whether the compliant device supports playback of the advertisement. For example, a compliant device may not be configured to display interactive advertisements, but the device is still considered to be compliant as long as the device reports that the interactive advertisement associated with a piece of video content were not displayed.

A non-compliant device is any device that is not configured to report online and/or offline playback of advertisements within video to the video hosting server 100 when network connectivity is available. For example, a non-compliant device can also be a portable media player or set-top box with the primary distinction being that the non-compliant device does not report advertisement playback to the video hosting server 100, although the non-compliant device is capable of displaying the video content and the advertisements in the various formats described above. Because non-compliant devices do not report advertisement playback to the video hosting server 100, these devices are not capable of receiving any shared revenue generated by the advertisements. Non-compliant devices may also be considered as any device that cannot support at the minimum in-stream video advertisements and static image advertisements according to one embodiment.

A content publisher 127 provides videos to the video hosting server 100 via the network 130 or through other mechanisms such as through traditional mail. A content publisher 127 is an entity that owns or controls at least some of the rights to a particular video. The content publisher 127 may be an individual, a group of individuals, or an entity such as music or video production company or studio or artist group. The content publisher 127 provides video(s) to the video hosting server 100 for viewing by other users of the video hosting server 100. In one embodiment, videos provided by content publishers 127 include advertisement ("ad") slots (i.e., insertion points) specified by the content publishers 127. The ad slots define advertising opportunities (i.e., locations for advertisements) within a piece of content. The ad slots are spatial-temporal regions within videos in which advertisements may be placed. The ad slots also contain ad slot information that allows the video hosting server 100 or client 121 to identify and/or retrieve advertisements to be used in the slots. Generally, the ad slot information associated with an ad slot describes advertising attributes of the ad slot. The ad slot information included in an ad slot is further described below. While only one content publisher 127 is shown, it is understood that any number of content providers are supported and can be in communication with the video hosting server 100 at any time.

Note that in the following discussion, the video hosting server is responsible for serving of video content, whereas the advertisement service 129 is responsible for providing advertisements and ad tags to be included in videos for serving to clients 121 by the video hosting server 100. However, it is appreciated that the teachings disclosed herein may be applied to other embodiments in which the video hosting server 100 includes the advertisement module 111 and advertisement database 120 so that the video hosting server 100 controls the selection of advertisements and ad tags for inclusion in videos.

An advertisement service 129 is an entity that is independent from the content hosting service 100 and provides advertisements to the video hosting server 100 and/or client 121. In one embodiment, the advertisement service 129 determines advertisements and advertisement (ad) tags for insertion into video content. Generally, ad tags describe information about advertisements and contain the information needed by the client 121 to display and report on the advertisements.

In one embodiment, responsive to the video hosting server 100 receiving a request for a video for serving to a client 121 and determining the ad slots included in the video where advertisements can be displayed, the advertisement service 129 is contacted. The advertisement service 129 then retrieves advertisements and their associated ad tags to be displayed in the advertisement slots within the video for communication to the video hosting server 100, which then inserts the advertisements and ad tags either directly into the advertisement slots or else where in the video. Ad tags are described in further detail below in reference to the advertisement module 111 and FIGS. 2A-2B.

In one embodiment, rather than the advertisement service 129 providing advertisements to the video hosting server 100 for insertion into a video being served, the advertisement service 129 provides advertisements and ad tags to the client 121. That is, once a client 121 receives a video including ad slots, the advertisement service 129 receives a request from the client 129 for advertisements for inclusion in the ad slots. The advertisement service 129 then determines the advertisements based on ad slot information associated with the ad slots and transmits the advertisements and ad tags to the client 129. Once the advertisements and tags are received, the client 129 proceeds to insert the advertisements into the ad slots for playback.

Additionally, the advertisement service 129 receives advertisement playback reports from clients 121 which describe a user's interaction with advertisements within a video. The advertisement service 129 may determine payment distribution based on the advertisement playback reports.

In one embodiment, the advertisement service 129 comprises an advertisement module 111. The advertisement module 111 determines advertisements to include within the advertisement slots based on the ad slot information associated with each ad slot. The ad slot information may describe advertising attributes associated with the ad slot. The attributes may include a relative priority of an ad format for an ad slot and/or the maximum combined duration of advertisements to be served in the slot. The attributes may also describe the maximum number of advertisements that can be served in the slot. The advertisement module 111 selects advertisements based on the attributes specified by the ad slot information.

Alternatively, the advertisement module 111 makes the determination based on various criteria including the types of advertisement formats suited for the capabilities of the client 121 in which advertisement will be displayed in combination with the ad slot information described above. In one embodiment, the advertisement module 111 may request a model ID from the client 121 which identifies the particular model device of the client 121. The advertisement module 111 determines the display capabilities of the client 121 from stored information regarding the model of the device associated with the particular model ID. Once the display capabilities of the client 121 are established, the advertisement module 111 determines advertisements having advertisement formats that the client 121 is capable of supporting.

Additionally, the advertisement module 111 determines advertisements to include in videos based on the content of the video itself in combination with the ad slot information. The advertisement module 111 determines advertisements that comprise advertisement content related to the video content of a video. For example, if the video being served has content related to motorcycles, the advertisement module 111 may display motorcycle related advertisements. The content of the video may be determined by the advertisement module 111 from metadata associated with the video such as the video title, video description or video tags. Alternatively, the advertisement module 121 may determine user hobbies or interests from information stored in the user database 117 and locate advertisements corresponding to those hobbies or interests.

Once the advertisements that are to be included in a video have been determined, the advertisement module 111 retrieves the determined advertisements from the advertisement database 120 that stores advertisements. The advertisement database 120 stores a plurality of advertisements that can be included in videos. The advertisement module 111 inserts the determined advertisements in an advertisement pool that is associated with the video. In one embodiment, an advertisement pool is a collection of advertisements that are included in a video. The advertisement module 111 then sends the advertisement pool to the video hosting server 100 or client 121 for insertion into the video. Alternatively, the individual advertisements may be sent to the video hosting server 100 or client 121.

By having a plurality of advertisements within the advertisement pool, a client 121 that is operating offline can vary the display of advertisements within the video rather than only displaying a single fixed set of advertisements. Showing only a single set of advertisements can result in the user of the client 121 becoming uninterested in viewing the advertisements. The different advertisements keep the user interested in the content of the advertisements so that the user watches the advertisements rather than skipping forward to the content of the video. In various embodiments, viewing of advertisements cannot be skipped by the user. Additionally, by having a plurality of ad content available to the client 121, the client 121 can perform a limited amount of advertisement targeting. For example, ad slots within a video could direct the client 121 to select different advertisement content based upon the demographics of the current user associated with the client 121.

Furthermore, the advertisement module 111 determines advertisement (ad) tags to embed in videos based on the advertisements that will be included in the videos. In one embodiment, each ad tag is associated with a particular advertisement. In an embodiment in which the video hosting server 100 is functioning as the advertisement service 129, the ad tags may be determined by the advertisement module 111 during initial upload of the video, if advertisements associated with the ad tags are selected and inserted into the video during the initial upload of the video to the video hosting server 100, or the ad tags may be determined during serving of a video with advertisements to client 121. In embodiments where the advertisement service 129 is independent from the video hosting server 100, the advertisement module 111 determines the ad tags when a request from the client 121 or video hosting server 100 is received for advertisements for inclusion in a video.

In one embodiment, an ad tag contains information needed by the client 121 to display the advertisement associated with the ad tag. The ad tag also includes information that describes the user-advertisement interaction criteria that should be monitored for reporting purposes. User-advertisement interaction criteria describe any types of user involvement with an advertisement. For example, the ad tag may specify that the advertisement associated with the ad tag is an in-stream video advertisement and that the client 121 should monitor the total amount of the time that the advertisement was viewed by the user. The ad tags also include additional information such as a tag identification that uniquely identifies the tag and/or a service identification that identifies an advertisement service associated with the ad tag as further described in FIGS. 2A-2B.

In one embodiment, the uploaded videos provided from the content publisher 127 are processed by an ingest module 107 at the video hosting server 100. The ingest module 107 processes the video for storage in the video database 119. The processing can include appropriate transformations for the video content. For example, video processing can include format conversion (transcoding), compression, metadata tagging, and other data processing. The uploaded videos can include, for example, video, audio or a combination of video and audio. The ingest module 107 processes the videos in order to standardize content for playback to users of client 121. This enables the video hosting server 100 to receive uploaded videos of various formats, while still being able to provide a standardized output to users of client 121. Once uploaded videos have been formatted, the ingest module 107 stores the videos. An uploaded video is associated with the content publisher 127 and the content publisher's account record is updated in the user database 117 as needed.

The video database 119 is used to store the uploaded videos. The video database 119 stores videos and associated metadata provided by their respective content publisher 127. Each uploaded video is assigned a video identifier (ID) when it is processed by the ingest module 107. The video files have metadata associated with each file such as a video ID, artist, video title, label, genre, time length, and optionally geo-restrictions that can be used for data collection or content blocking on a geographic basis.

In some embodiments, the user database 117 is responsible for maintaining a record of all registered users of the video hosting server 100. Registered users include content publishers 127 and/or users who simply view videos on the video hosting website 100. Each content publisher 127 and/or individual user registers account information including login name, electronic mail (e-mail) address and password with the video hosting server 100. This account information is stored in the user database 117.

The security module 115 provides security measures that prevent an attacker or other malicious agent from removing advertisement content and associated advertisement tags from video content during initial transmission of the content to compliant devices, during storage on the devices, or during potential re-transmission of the content. The security measures also prevent the attacker from modifying or inserting advertisement content and advertisement tags into video content that would cause the device to interact with a different advertisement service or cause the video to impersonate a different video.

In one embodiment, to allow for detection of tampered ad tags, the security module 115 hashes and digitally signs each uploaded video. The client 121 must then verify the signature to determine if the video has been tampered with. In one embodiment, if client 121 determines that the signature is not valid, this information is then reported back to video hosting server 100 when a network connection exists. In various embodiments, video hosting server 100 and/or content publisher 127 specify whether client 121 may play a video that does not include a valid signature. Thus, in some embodiments, videos without a valid signature are still played at the client 121 and in other embodiments videos without a valid signature are not played.

The compensation module 113 determines the amount of total revenue generated by clients 121 based on the reported user interaction with advertisements within video content. The compensation module 113 analyzes user interaction reports received from the clients 121 based on advertisement interaction criteria. The advertisement interaction criteria include the length of time in which an advertisement was viewed, the number of instances in which an advertisement was viewed, the percentage of time in which an advertisement was viewed and/or any user interaction with the advertisement such as clicking on a hyperlink within the advertisement. Additionally, the compensation module 113 also corrects for any fraudulent activities in the interaction reports such as spam or fraud.

The advertisement interaction information is corresponded to compensation criteria such as rate per time viewed, rate per percentage viewed, rate per click or rate per view. The compensation module 113 calculates the total amount of revenue generated by clients 121 based on the values of the compensation criteria and values associated with the advertisement interaction criteria. In one embodiment, the compensation module 113 splits the generated revenue among various entities including the content hosting server 100, the manufacturer of the client 121 and/or the content publisher 127 or any combination thereof. The distribution may be based on fixed percentages of compensation allocated to each entity. In alternative embodiments, the compensation module 113 may be included in the advertisement service 129. Thus, the advertisement service 129 can also be involved in the distribution of compensation.

Video Format

Referring now to FIG. 2A, there is shown one embodiment of a video format that is conducive for advertisement purposes. The video 200 comprises video content 201A, 201B, 201C, ad slots 203, 205 and 207, an advertisement pool 209, and a digital signature 213. Note that the format of FIGS. 2A and 2B are not necessarily to scale.

The video content 201 may be any type of video content uploaded to the video content server 100. The video content 201 is configured to be displayed to the user by the browser 123. Within the video 200 are various ad slots 203, 205 and 207. Each ad slot identifies one instance of an advertising opportunity within the video content. As previously mentioned, the ad slots are defined by the content publisher 127. The number of ad slots shown in FIG. 2A is merely exemplary and any number of ad slots can be included in a video. The ad slot information included in ad slots is described in further detail in FIG. 2B.

The video 200 also comprises an ad pool 209. The ad pool 209 comprises ad content 211A-D and ad tags 215A-D. Each item of ad content 211 includes an ad tag 215 associated with the ad content that can be played within the video 200. As shown in FIG. 2A, the ad pool 209 includes ad content 211A-D. Each ad content 211 is associated with an ad tag 215. For example, ad content 211A is associated with ad tag 215A. Note that the ad pool 209 may comprise any number of items of ad content 211 for inclusion in the video as determined by the video hosting server 100.

As previously noted, an ad tag is used by the client 121 to properly display the advertisements within the video. The ad tag describes ad format-specific attributes that describe additional information specific to the advertisement format associated with the ad tag. For overlay advertisements, the ad tag includes allowable dimensions of the overlay as a percentage of the content video size so that the client 121 can properly display the advertisement. For example, the ad tag may specify that the overlay advertisement may only be a maximum of ten percent of the total video size. The ad tag may also describe the location in which the overlay advertisement is to be displayed in the video.

In one embodiment, the ad tags may also specify how to monitor and report the display of a piece of ad content. For example, the ad tag may specify to track (i.e., count) the number of times the ad content was displayed. Alternatively, more complex rules may be specified by an ad tag. For example, the ad tag may include the time range in which the ad content may be displayed in the video and the ad tag may specify to report on every continuous time segment that the ad was displayed.

Furthermore, an ad tag also includes a tag identification (ID), which is a globally unique identifier for the particular ad tag. In one embodiment, each time a video is served to the client 121, the corresponding tag ID will change allowing the video hosting server 100 to identify the specific user who viewed the video 200. In embodiments where an advertisement service 129 distributes advertisements, the tag ID identifies the specific content distributer that served the video.

An ad tag also includes a service ID that identifies the advertisement service (e.g., the video hosting server 100) associated with the ad tag. The service ID indicates to the client 121 the advertisement service that should be contacted for reporting of user interaction with advertisements within the video as each ad tag is associated with a specific advertisement service. The service ID allows for multiple advertisement services to provide advertisements that can be included within a video. In embodiments where the video hosting server 100 functions as the advertisement service an ad tag includes a service ID corresponding to the video hosting server 100.

FIG. 2B illustrates an example of an ad slot 203. Note that the structure of an ad slot in FIG. 2B is extensible to ad slots 205 and 207 and is not restricted as to only apply to ad slot 203 as shown in FIG. 2B. Ad slot 203 comprises ad slot information 217, which describes the advertising attributes associated with the ad slot needed by the advertisement service 129 to select appropriate advertisements for that particular slot. The advertising attributes may be determined by the content publisher 127 or by the advertisement service 129 if the advertisement service 129 is in communication with the content publisher 127 to determine ideal advertising attributes for videos associated with the content publisher 127.

In one embodiment, the ad slot information 217 includes the attribute of a relative priority of a specific ad format associated with the ad slot. Because the advertisement service 129 offers a variety of ad formats, the ad slot information 217 may indicate the preferred types of ad formats used in an ad slot. For example, the ad slot information 217 may indicate that image overlay advertisements are preferred in the ad slot 203 followed by embedded static images.

The ad slot information 217 also describes the attribute of the maximum combined duration of advertisements to be served in the ad slot 203. That is each ad slot has a maximum duration for advertising purposes. Additionally, the ad slot information 217 comprises the maximum number of advertisements that can be served in the ad slot. In one embodiment, a plurality of advertisements can be included in a single ad slot as long as the duration of the advertisements does not exceed the specified maximum duration of advertisement display. In other embodiments, only a single advertisement may be displayed in an ad slot.

In one embodiment, the ad slot information 217 describes the order and/or frequency with which an ad content in the ad pool 209 should be displayed in the ad slot associated with the ad slot information. That is, the ad slot information 217 may specify a selection policy for selecting ad content from an ad pool. For example, a selection policy may be based on the least frequently used ad content in the ad slot. Each time the ad slot is encountered during video playback, the client 121 selects an ad content from the ad pool using the policy specified by the ad slot information.

Additional selection policies may include selection based at least in part on the particular instance in which the video 200 is played. For example, during the first instance in which the video 200 is played, the ad slot information 217 associated with ad slot 203 may specify that ad content 211C will be displayed in ad slots 203 during that instance. Then during the second instance in which the video 200 is played, the ad slot information 217 may specify that ad content 211D, which has not yet been displayed, is shown in ad slot 203. In addition to this round-robin method, advertisements may have an associated weighting allocated by either or both of the advertisement service 129 and video hosting server 100, which further influence the choice of display order.

The ad slot information 217 also includes information on how to display advertisements via dynamic fetching. For instance, information may be included that allows for clients 121 that are capable of dynamic fetching to retrieve advertisements directly from the advertisement service 129 to replace a currently embedded advertisement when network connectivity is available. This allows for the display of new and potentially better targeted advertisements each time the video is viewed by the user. The ad slot information 217 may include instructions to report the model ID/device ID associated with the client 121 to the advertisement service 129 so that the advertisement service 129 can provide new advertisements to include in the video. The device ID is a unique identifier for the particular device.

FIG. 2B illustrates an example format that can be used with dynamic fetching. The client 121 provides ad slot information 217 associated with ad slot 203 to the video hosting server 100. The ad slot information 217 indicates that advertisement service 129 is to be contacted for advertisements to be used in ad slot 217. The video hosting server 100 contacts advertisement service 129 at serving time for an advertisement for display in ad slot 217. The video hosting server 100 receives the advertisement from the advertisement service 129 and inserts the ad content 211 (e.g., an in-stream advertisement) and an associated ad tag 215 at the corresponding time within the video that is associated with the ad slot 217. The video hosting server 100 also updates ad slot information 217 to indicate the presence of the newly added ad content 211.

The video hosting server 100 also updates ad slot information 217 to indicate that advertisements are selected from ad pool 209. Thus, when a client 121 plays back video 200, the client 121 can either play the newly added ad content 211 which is already included in the video 200, or the client 121 alternatively selects one of ad content 211A-D from ad pool 209 and display the selected advertisement instead of ad content 211. In one embodiment, the client 121 also contacts advertisement service 129 for new advertisement content to be shown in the video 200. Whether the client 121 plays back video 200 with ad content 211 that is already included in the video 200 or if the client 121 selects ad content 211A-D from the ad pool 209 is dependent on the instructions indicated in the ad slot information 217.

In one embodiment, an ad slot information 217 includes instructions to retrieve the initial advertisements for embedding into a video by a client 121 rather than the video being served to the client 121 with advertisements already embedded. The ad slot information 217 includes instructions for the client 121 to contact the advertisement service 129 with the ad slot information 217 so that the advertisement service 129 can return the initial advertisements for display in the video. The client 121 then receives advertisements from the advertisement service 129 and inserts the ad content into the ad slots.

In FIG. 2A, the advertisements are displayed in sequence within the video depending on the associated ad slot. However, the advertisements may also be referenced or pointed to by the ad slot information included in each ad slot or retrieved from the advertisement service 129 during playback.

In one embodiment, the representation of ad tags within a video is based at least in part on the video player that will be playing the video. Different video players are each capable of supporting specific video container formats such as MP4 or Flash. The ad tags are represented in a video based on the container format supported by the video player. For example, in a MP4 format, the video file may include a text track that contains samples within the text track that are synchronized with the specific portions of the video file in which the advertisements associated with the tags are to be displayed. The data for a given ad tag may be stored as XML within the sample.

Compliant Devices

Figure 3:
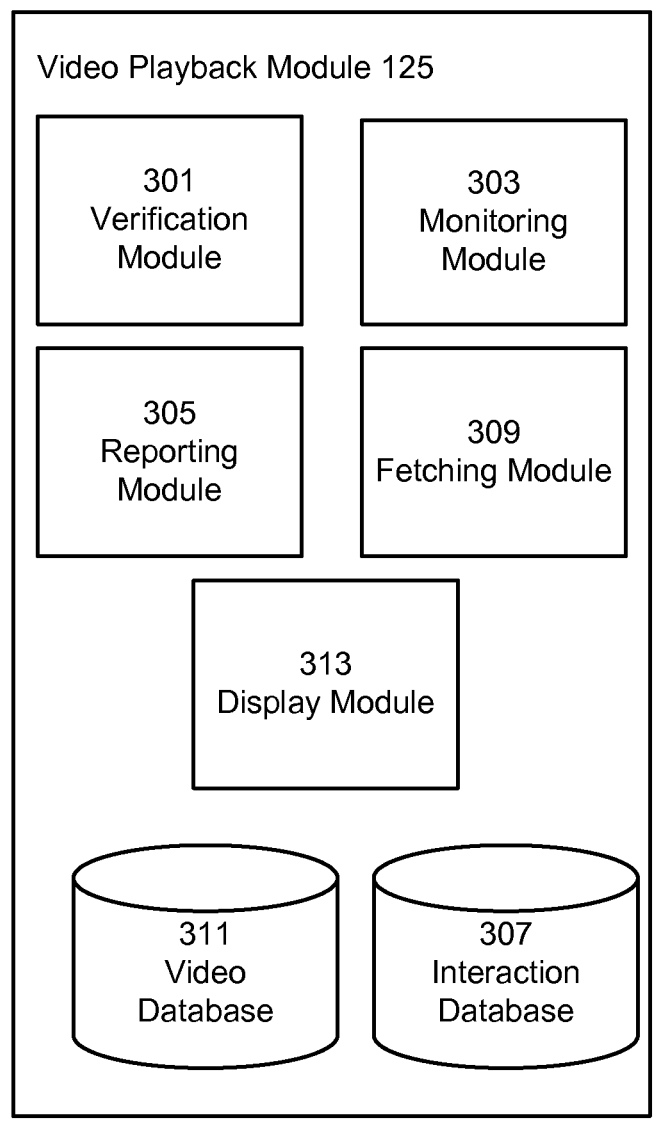
FIG. 3 illustrates a high-level block diagram of a detailed view of an video playback module of a compliant offline client device according to one embodiment.

Referring now to FIG. 3, there is shown a detailed view of a video playback module 125 of a client 121 which represents a compliant device in one embodiment. As shown in FIG. 3, the video playback module 125 includes multiple modules and/or databases. The term "module," as used in this description, refers to computer executable logic for providing the specified functionality. A module can be implemented in hardware, firmware, and/or software or in combination. It will be understood that the modules described herein represent one embodiment of the present disclosure. Certain embodiments may include other modules. In addition, the embodiments may lack modules described herein and/or distribute the described functionality among the modules in a different manner.

The video playback module 125 generally serves as a means for a compliant device to retrieve advertisements from the advertisement service 129 and to report advertisement playback information to the video hosting server 100. The video playback module comprises a verification module 301, a monitoring module 303, a reporting module 305, an interaction database 307, a video database 311, and a display module 313. The video playback module 125 may optionally comprise a fetching module 309 if the client 121 supports dynamic fetching of advertisements.

The interaction database 307 stores information that describes a user's interaction with advertisements in videos along with any security issues associated with the videos. The advertisement interaction information and security information stored in the interaction database 307 are used to generate an advertisement interaction report which describes how a user interacted with each advertisement within a video. The information in the advertisement interaction report is the basis in which compensation for advertisement display is determined by the video hosting server 100.

The video database 311 stores videos that have been downloaded to the client 121 from the video hosting server 100. Additionally, the video database 311 stores videos downloaded from other sources that are available via the network 130.

The verification module 301 validates the digital signature of videos to verify that a video has not been tampered with and that its ad tag(s) have not been altered by a malicious user in any manner. If the verification module 301 determines that the signature is valid, no action is taken by the verification module 125. However, if the verification module 301 determines that signature is not valid, the verification module 301 logs that the video has been compromised in the interaction database 307. In one embodiment, regardless of whether a video has been tampered with, a client 121 is still capable of playing the video and its associated advertisements, but the client 121 is no longer eligible to receive revenue based on the display of the advertisements. Alternatively, the verification module 301 may communicate with the video hosting server 100 when network connectivity is available for input as to whether a video without a valid signature can still be played.

The display module 313 determines the locations of the advertisement slots specified in the video. Once the advertisement slots are identified, the display module 313 selects which advertisements from the advertisement pool to display in the video along with the order of the display according to the ad slot information associated with each determined ad slot. Furthermore, the display module 313 analyzes the advertisement tags associated with each advertisement to determine any specific attributes of the advertisement needed by the video player of client 121 during the display of the advertisements at the advertisement slots.

The monitoring module 303 monitors user interactions with advertisements in videos based on the user interaction criteria specified by the advertisement tags within a video. Because users can skip video advertisements such as in-stream video advertisements or static image advertisements, user interactions with advertisements is measured and logged in order to determine the amount of compensation a content publisher 127 and/or client manufacturer should receive for the display of the advertisements.

For each display of an advertisement, the monitoring module 202 assigns a playback ID for that particular display of the advertisement. Under each playback ID, the monitoring module 303 measures and logs the amount of total time that an advertisement was displayed. Alternatively, the monitoring module 303 logs the total percentage of the advertisement that was played. For example, a video may have been played a total of six times at a client 121. If the user only watched a particular advertisement a total of three times, the watch percentage of the advertisement is fifty percent. The monitoring module 303 also can log the percentage of playback of the video that included the advertisements. The monitoring module 303 stores the playback information of the advertisement in the interaction database 307.

Additionally, the monitoring module 303 monitors any direct interaction with an advertisement by a user other than viewing the advertisement. In one embodiment, the monitoring module 305 logs any user interest in the advertisement. User interest is indicated by various interest criteria including the user clicking on a hyperlink within the advertisement that causes the client 121 to navigate to the advertiser's home page, or the user clicking on a hyperlink that provides additional content related to the advertisement in the form of video, image, text or a combination thereof. In one embodiment, user interest includes user interaction with an interactive application, such as a Flash or Java applet, that is embedded within the video.

The monitoring module 303 stores the user interest information in the interaction database 307. The user interest information is used to determine similar or related advertisements that can be delivered to the user as embedded advertisements in future videos served to the client 121, or additional related advertisements may be e-mailed to the user if an e-mail address was provided by the user. Additionally, the user interest information may be used to determine related videos of possible interest to the user based on the content of the advertisement and whether the user was interested in the advertisement.

As noted, some clients 121 may support dynamic fetching of advertisement. Clients 121 that support dynamic fetching also comprise a fetching module 309 within the video playback module 125. When network connectivity is available, rather than displaying advertisements from an advertisement pool, the fetching module 309 retrieves advertisements from the video hosting server 100 during the display of the video. The fetching module 309 displays the retrieved advertisements in place of the advertisements in an advertisement pool of a video.

To dynamically fetch an advertisement, the fetching module 309 provides each ad slot's advertisement slot information to the advertisement service 129. The advertisement slot information of each ad slot allows the advertisement service 129 to select advertisements for display in the advertisement slot based on the advertisement attributes associated with the ad slot. Additionally, the fetching module 309 provides a device ID and a model ID of the client 121 to the video hosting server 100 so that advertisements appropriate for the capabilities of the client 121 are selected.

In one embodiment, rather than fetching advertisements from the advertisement service 129 to replace existing advertisements within a video, the fetching module 309 requests the initial advertisements and their associated ad tags for a received video from the advertisement service 129. That is, the video is received at the client 121 without any advertisements and the fetching module 309 retrieves the initial set of advertisements for the video. The fetching module 309 provides the advertisement service 129 the ad slot information for each ad slot in the received video to allow the advertisement service 129 to select advertisements in the advertisement slots based on the attributes associated with each advertisement slot. Once the advertisements are received from the advertisement service 129, the fetching module 309 provides the advertisements and ad tags to the display module 313 for display.

The reporting module 305 generates advertisement interaction reports based on the information stored in the interaction database 307. An advertisement interaction report describes a user's interaction with the advertisements included within a video. In one embodiment, the reporting module 305 aggregates all the playback information associated with a particular advertisement by combining the playback information under each playback ID associated with the advertisement. Additionally, the advertisement interaction report includes any security issues associated with a video and any user interest information as previously described above.

The advertisement interaction report is used by the video hosting server 100 or advertisement service 129 to determine the amount of compensation a content publisher 127 and/or client manufacturer should receive. Once the reporting module 305 has generated an advertisement interaction report, the reporting module 305 monitors for availability of network connectivity in order to transmit the advertisement interaction report to the video hosting server 100 once connectivity is available. In one embodiment, the reporting module 305 transmits the advertisement interaction report to the advertisement service associated with the service ID of the advertisements or to the video hosting server 100 in other embodiments.

The reporting module 305 also provides the device ID and/or model ID in the advertisement interaction report. The model ID in possible conjunction with the device ID is included in the advertisement interaction report so that the video hosting server 100 can determine the manufacturer that should receive the share of the advertisement revenue. The reporting module 305 may also include whether the fetching module 309 replaced any previously embedded advertisements with any dynamically fetched advertisements, if applicable.

Process Overview

Figure 4:
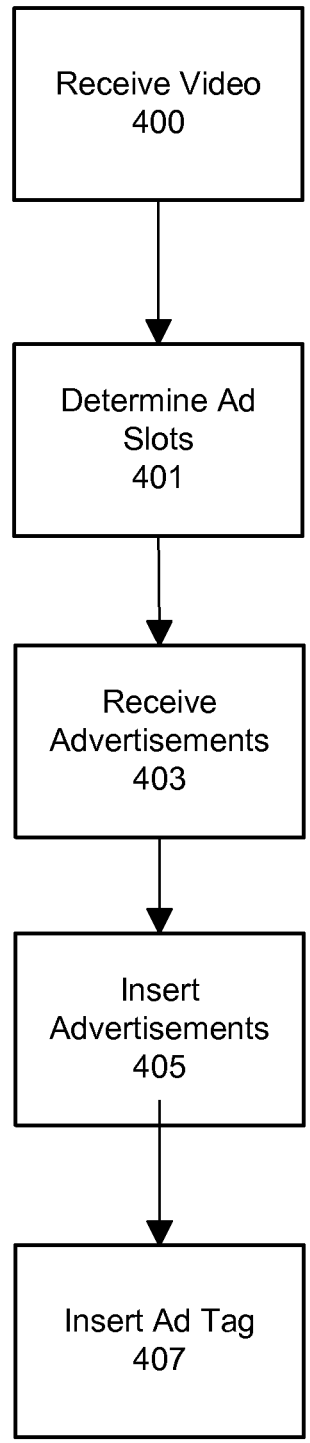
FIG. 4 is a flow diagram illustrating a method for formatting an uploaded video into a video format for advertisement purposes according to one embodiment.

Referring now to FIG. 4, there is shown a method for formatting an uploaded video into an advertising format according to one embodiment. Note that the figures may omit some possible steps. In addition, some embodiments perform different steps in addition to, or instead of, the ones described herein. Furthermore, the order of the steps can vary from that described herein.

In the illustrated embodiment, the ingest module 107 receives 400 an uploaded video from a content publisher 127. The ingest module 107 processes the video for storage in the video database 119 and in order to standardize the content for playback to users of client 121. Once the uploaded video has been processed, the video analysis module 109 determines 401 advertisement slots included in the video that indicate locations in the video where advertisements will be displayed. As previously noted, advertisement slots are determined by the content publisher 127. After the advertisement slots are determined, the video serving module 103 receives 403 advertisements for display in the determined advertisement slots from the advertising service 123. That is, once the slots are determined, the advertising service 123 is contacted by the video serving module 103 for advertisements for inclusion in the video. The video serving module 103 then inserts 405 the advertisements either into an advertisement pool within the video or directly into an advertisement slot in the video. The video serving module 103 then inserts 407 an advertisement tag associated with each advertisement received from the advertisement service 123 into the video where the advertisement tag and its associated advertisement are stored as advertisement content. In one embodiment, each time a video is served, the video serving module 103 contacts the advertising service 123 for a unique set of advertisement tags for insertion into the video with the advertisements. Alternatively, a fixed set of advertisement tags may be inserted into a video which are updated accordingly when newer or more relevant advertisements become available.

Figure 5:
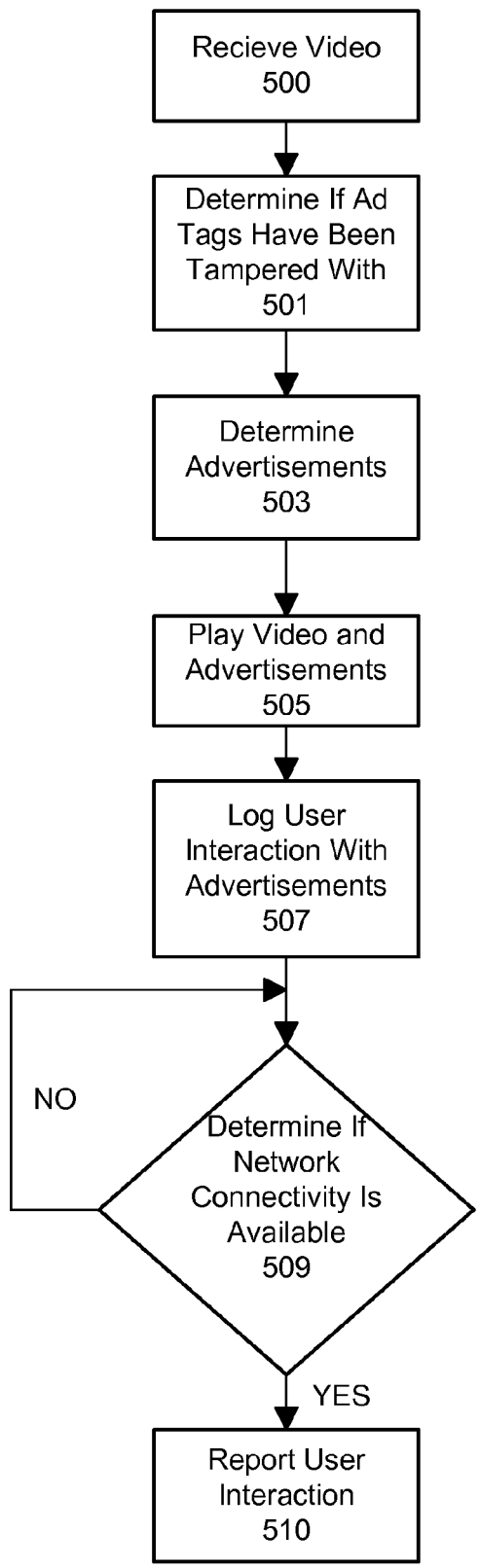
FIG. 5 is a flow diagram illustrating a method for reporting a user's interaction with advertisements within a video according to one embodiment.

FIG. 5 illustrates one embodiment of a method for a compliant device (i.e., client 121) to display advertisements within a video. In the illustrated embodiment, the client 121 receives 500 a requested video from the video hosting server 100. The verification module 301 determines 501 if the advertisement tags within the video have been tampered with by validating the associated signature. The client 121 then determines 503 advertisements for inclusion in the video. In one embodiment, if the client 121 is capable of dynamic fetching and network connectivity is available, the fetching module 309 may fetch the initial advertisements from the advertising service 123 to insert into the video or may fetch advertisements to replace advertisements embedded in an advertisement pool included with the video. If the client 121 is not capable of dynamic fetching, the display module 313 selects advertisements from the advertisement pool to display in the video in the advertisement slots. The client 121 then plays 505 the requested video and advertisements in the video according to the ad slot information and advertisement tags. The monitoring module 303 logs 507 any user interaction with the advertisements displayed in the video. The reporting module 305 then determines 509 if network connectivity is available. If network connectivity is available, the reporting module 305 reports 510 user interaction with advertisements in an advertisement interaction report to the video hosting server 100.

Figure 6:
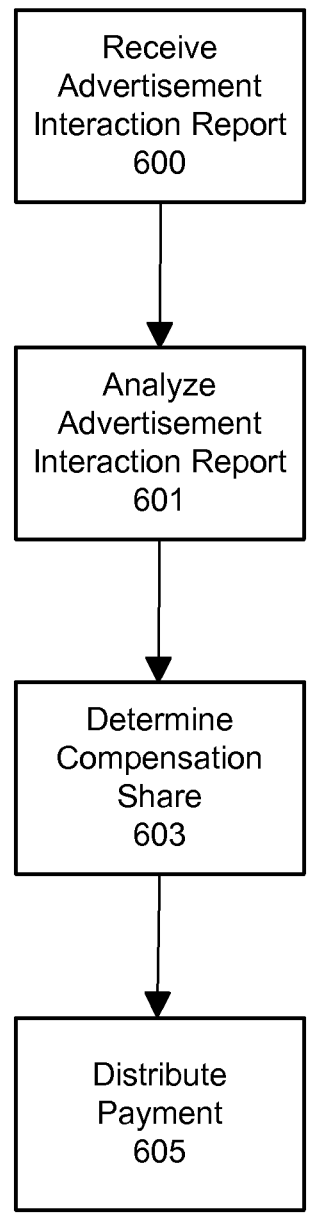
FIG. 6 is a flow diagram illustrating a method for determining compensation based on a user's interaction with advertisements within a video according to one embodiment.

FIG. 6 illustrates a method for the compensation module 113 to determine compensation based on a user's interaction with advertisements within a video. The compensation module 113 receives 600 an advertisement interaction report from the client 121. The compensation module 113 analyzes 601 the user interaction report to determine the total amount of interaction a user had with the advertisements within a video. Based on the amount of interaction a user had with advertisements within a video, the compensation module 113 determines 603 the share of the compensation that various entities including the video hosting server 100, manufacturer of the client 121 and/or content publisher 127 will receive. In one embodiment, once the compensation is determined, the compensation module 113 distributes payment 605 directly to the bank account associated with each entity. Alternatively, the compensation module 113 may generate a check to be mailed out to the entities.

The apparatus described above for performing the described operations may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing advertisements in videos through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A computer-implemented method for displaying advertisements in a video on a client device, the method comprising:
   transmitting, by the client device, a request for the video;
   receiving the video at the client device responsive to transmitting the request, the video including advertisement insertion points, each advertisement insertion point describing attributes for selection of advertisements to be inserted into the video at the advertisement insertion point;
   identifying, by the client device, the advertisement insertion points included in the video;
   responsive to unavailability of network connectivity:
      dynamically selecting, by the client device responsive to the unavailability of network connectivity, an advertisement from a plurality of candidate advertisements available for display at each advertisement insertion point according to the described attributes for selection of advertisements for each advertisement insertion point, each advertisement including an advertisement tag specifying parameters relating to display of the advertisement on the client device and the advertisement tag including instructions for the client device specifying one or more different types of user interactions with the advertisement for the client device to monitor during display of the advertisement if the advertisement is selected by the client device and to report monitored user interactions that occur during the display of the advertisement; and
      displaying the advertisements selected by the client device at the advertisement insertion points, each advertisement displayed in an advertisement insertion point according to an associated advertisement tag specifying parameters related to the display of the advertisement.

2. The computer-implemented method of claim 1, wherein the attributes for selection of advertisements describe a priority of advertisement formats for display at an associated advertisement insertion point.

3. The computer-implemented method of claim 1, wherein the attributes for selection of advertisements describe a maximum number of advertisements that can be inserted at an associated advertisement insertion point.

4. The computer-implemented method of claim 1, wherein the attributes for selection of advertisements describe an order in which an advertisement is to be displayed at an associated advertisement insertion point.

5. The computer-implemented method of claim 4, wherein the described order varies between a first and a second playing of the video at the client device.

6. The computer-implemented method of claim 1, wherein the attributes for selection of advertisements describe a frequency with which each selected advertisement is displayed at an associated advertisement insertion point.

7. The computer-implemented method of claim 1, wherein dynamically selecting the advertisement from the plurality of candidate advertisements available for display in the advertisement insertion point comprises selecting the advertisements from a collection of advertisements included with the video responsive to the unavailability of network connectivity.

8. The computer-implemented method of claim 7, further comprising:
   responsive to availability of the network connectivity, fetching advertisements to display within the video from an advertisement service to replace the advertisements from the collection of advertisements included with the video.

9. The computer-implemented method of claim 1, further comprising:
   responsive to network connectivity:
      requesting, by the client device, the advertisements from an advertisement service;
      receiving, by the client device, the advertisements from the advertisement service; and
      inserting, by the client device, each advertisement into the video at an associated advertisement insertion point in the video.

10. The computer-implemented method of claim 1 further comprising:
    measuring interactions with the advertisements by the user based on the advertisement tags associated with the advertisements; and
    generating a report that describes the interactions with the advertisements for compensation purposes.

11. The computer-implemented method of claim 10, further comprising:
    monitoring for availability of network connectivity; and
    responsive to the availability of network connectivity, transmitting the report to an advertisement service associated with the advertisements; and
    responsive to no availability of network connectivity, continuing monitoring for availability of network connectivity.

12. The computer-implemented method of claim 1, wherein the advertisement insertion points describes low interest regions within the video or transitions between scenes in the video.

13. The computer-implemented method of claim 1, wherein displaying the advertisements comprises:
    for each advertisement, analyzing the parameters relating to display of the advertisement specified in the advertisement tag; and
    displaying each advertisement in the video according to the parameters relating to display of each advertisement.

14. The computer-implemented method of claim 1, further comprising:
    determining types of user-interactions to measure for each advertisement based on the one or more different types of user interactions specified by the advertisement tag associated with each advertisement;

measuring user interaction with each advertisement according to the determined types of user interactions during playback of the video and the advertisements; and storing the user interaction associated with each advertisement.

15. The computer-implemented method of claim 1, wherein the one or more types of user interactions include a length of time an advertisement is displayed to the user.

16. The computer-implemented method of claim 1, wherein the one or more types of user interactions include a number of views of the advertisement by the user.

17. The computer-implemented method of claim 1, wherein the one or more types of user interactions include a percentage of time that an advertisement is viewed in the video by a user relative to a total possible display time of the advertisement.

18. The computer-implemented method of claim 1, wherein the one or more types of user interactions include clicking of a hyperlink within an advertisement.

19. The computer-implemented method of claim 1, further comprising:
validating a digital signature of the video to verify that the advertisement tags are not altered by a malicious user; and
logging whether the advertisement tags are altered.

20. The computer-implemented method of claim 10, wherein generating the report comprises:
aggregating the interactions with each advertisement for display in the report.

21. The computer-implemented method of claim 10, wherein the report further comprises information describing whether the advertisement tags have been altered.

22. The computer-implemented method of claim 10, wherein the report further comprises information indicating a manufacturer of the client device and a model associated with the client device.

23. The computer-implemented method of claim 10, further comprising:
determining an advertisement service associated with each advertisement from information included in the attributes for selection of advertisements to be inserted at an associated insertion point; and
for each advertisement, transmitting a report to an advertisement service associated with the advertisement, wherein the report describes user interaction with the advertisement.

24. A computer-implemented method for providing video advertisements to a client device, the method executed by a computer and comprising:
receiving a request for a video from a client device, the video including a plurality of advertisement insertion points, each advertisement insertion point describing attributes for selection of advertisements to be inserted into the video at the advertisement insertion point;
selecting, by a computer server, advertisements to be inserted by the client device at each of the advertisement insertion points according to the described attributes for selection of advertisements for each advertisement insertion point responsive to the client device lacking network connectivity;
inserting the selected advertisements into the video, each selected advertisement including an advertisement tag specifying parameters relating to the display of the advertisement on the client device and the advertisement tag including instructions for the client device specifying one or more different types of user interactions with the advertisement for the client device to monitor during display of the advertisement if the advertisement is selected for display by the client device and to report monitored user interactions that occur during the display of the advertisement; and
providing the video to the client device, the video including the advertisement insertion points describing the attributes for selection of advertisements to be inserted into the video, the advertisements for display at the advertisement insertion points, and advertisement tags associated with the advertisements that specify the parameters related to the display of the advertisements on the client device and including the instructions for the client device specifying one or more different types of user interactions with the advertisements for the client device to monitor during display of the advertisements and to report monitored user interactions that occur during the display of the advertisements.

25. The computer-implemented method of claim 24, wherein selecting advertisements to be inserted at the insertion points further comprises:
selecting advertisements having content associated with the video content.

26. The computer-implemented method of claim 24, wherein selecting advertisements to be inserted by the client device at the insertion points further comprises:
providing an advertising service the attributes for selection of advertisements to be inserted at each insertion point; and
receiving for each insertion point, one or more advertisements according to the attributes associated with the insertion point.

27. The computer-implemented method of claim 24, wherein selecting advertisements to be inserted by the client device at the insertion points further comprises selecting advertisements having a format that the client device is capable of displaying.

28. The computer-implemented method of claim 24, wherein inserting the selected advertisements into the video comprises:
inserting the selected advertisements into an advertisement pool associated with the video, wherein the advertisement pool represents a collection of advertisements from which the client device displays at the advertisement insertion points at least one of the advertisements in the collection.

29. The computer-implemented method of claim 24, wherein the parameters relating to display of the advertisement on the client device include attributes of an advertisement format associated with the advertising tag.

30. The computer-implemented method of claim 24, wherein the one or more different types of user interactions include a length of time an advertisement is displayed to a user.

31. The computer-implemented method of claim 24, wherein the one or more different types of user interactions include a number of views of the advertisement by a user.

32. The computer-implemented method of claim 24, wherein the one or more different types of user interactions include a percentage of time that an advertisement in the video is viewed by a user relative to a total possible display time of the advertisement.

33. The computer-implemented method of claim 24, wherein the one or more different types of user interactions include clicking of a hyperlink in an advertisement within the video.

34. The computer-implemented method of claim 24, wherein the attributes for selection of advertisements for each insertion point further describes an identification of an advertisement service for reporting user interaction with the associated advertisement.

35. The computer-implemented method of claim 24, wherein the attributes for selection of advertisements for each insertion point further include instructions to cause the client device to report a model identification and a device identification associated with the client device to dynamically fetch advertisements for display in the video.

36. The computer-implemented method of claim 24, further receiving identification of the advertisement insertion points included in the video from a content publisher associated with the video.

37. The computer-implemented method of claim 24, wherein the attributes for selection of advertisements for each insertion point describe a priority of advertisement formats for display at the insertion point.

38. The computer-implemented method of claim 24, wherein the attributes for selection of advertisements for each insertion point describe a maximum number of advertisements that can be inserted at the insertion point.

39. The computer-implemented method of claim 24, wherein the attributes for selection of advertisements for each insertion point describe an order in which advertisements are to be displayed in the insertion point.

40. The computer-implemented method of claim 39, wherein the described order varies between a first and a second playing of the video.

41. The computer-implemented method of claim 24, wherein the attributes for selection of advertisements for each insertion point describe describes a frequency with which each selected advertisement is displayed at the associated insertion point.

42. The computer-implemented method of claim 24, further comprising:
receiving a report from the client device describing interactions with the advertisements by the user;
determining a total amount of revenue generated by the advertisements; and
distributing the revenue to a manufacturer associated with the client device and a content publisher associated with the video.

43. The computer-implemented method of claim 42, wherein determining a total amount of revenue comprises:
determining from the report a total amount of time that each advertisement was interacted with by the user; and
determining the total amount of revenue generated by the advertisements based at least in part on the total amount of time.

44. A computer program product for displaying advertisements in a video on a client device, comprising a non-transitory computer-readable storage medium containing computer program code for controlling a processor to perform a method comprising:
transmitting, by the client device, a request for the video;
receiving the video at the client device responsive to transmitting the request, the video including advertisement insertion points, each advertisement insertion point describing attributes for selection of advertisements to be inserted into the video at the advertisement insertion point;
identifying, by the client device, the advertisement insertion points included in the video;
responsive to unavailability of network connectivity:
dynamically selecting, by the client device responsive to the unavailability of network connectivity, an advertisement from a plurality of candidate advertisements available for display at each advertisement insertion point according to the described attributes for selection of advertisements in each advertisement insertion point, each advertisement including an advertisement tag specifying parameters relating to display of the advertisement on the client device and the advertisement tag including instructions for the client device specifying one or more different types of user interactions with the advertisement for the client device to monitor during display of the advertisement if the advertisement is selected by the client device and to report monitored user interactions that occur during the display of the advertisement; and
displaying the advertisements selected by the client device at the advertisement insertion points, each advertisement displayed in an advertisement insertion point according to an associated advertisement tag specifying parameters related to the display of the advertisement.

45. A computer program product for providing video advertisements to a client device, comprising a non-transitory computer-readable storage medium containing computer program code for controlling a processor to perform a method comprising:
receiving a request for a video from a client device, the video including a plurality of advertisement insertion points, each advertisement insertion point describing attributes for selection of advertisements to be inserted into the video at the advertisement insertion point;
selecting, by a computer server, advertisements to be inserted by the client device at each of the advertisement insertion points according to the described attributes for selection of each insertion point responsive to the client device lacking network connectivity;
inserting the selected advertisements into the video, each selected advertisement including an advertisement tag specifying parameters relating to the display of the advertisement on the client device and the advertisement tag including instructions for the client device specifying one or more different types of user interactions with the advertisement for the client device to monitor during display of the advertisement if the advertisement is selected for display by the client device and to report monitored user interactions s that occur during the display of the advertisement; and
providing the video including the advertisements to the client device, the video including the advertisement insertion points describing the attributes for selection of advertisements to be inserted into the video, the advertisements for display at the advertisement insertion points, and advertisement tags associated with the advertisements that specify parameters related to the display of the advertisements on the client device and including the instructions for the client device specifying one or more different types of user interactions with the advertisements for the client device to monitor during display of the advertisements and to report monitored user interactions that occur during the display of the advertisements.

46. A client device for displaying advertisements in a video at the client device, the client device comprising:
a computer processor; and a computer-readable storage medium storing instructions that when executed by the processor causes the processor to perform the steps of:
- transmitting a request for the video;
- receive the video responsive to transmitting the request, the video including advertisement insertion points, each advertisement insertion point describing attributes for selection of advertisements to be inserted into the video at the advertisement insertion point;
- identify advertisement insertion points included in the video;
- responsive to unavailability of network connectivity:
  - dynamically select an advertisement from a plurality of candidate advertisements available for display at each advertisement insertion point according to the described attributes for selection of advertisements of each advertisement insertion point responsive to the unavailability of network connectivity, each advertisement including an advertisement tag specifying parameters relating to display of the advertisement on the client device and the advertisement tag including instructions for the client device specifying one or more different types of user interactions with the advertisement for the client device to monitor during display of the advertisement if the advertisement is selected by the client device and to report monitored user interactions that occur during the display of the advertisement; and
  - display the advertisements selected by the client device at the advertisement insertion points, each advertisement displayed in an advertisement insertion point according to an associated advertisement tag specifying parameters related to the display of the advertisement.

47. A system for providing video advertisements to a client device, the system comprising:
- a computer processor; and
- a computer-readable storage medium storing instructions that when executed by the processor causes the processor to perform the steps of:
  - receive a request for a video from a client device, the video including a plurality of advertisement insertion points, each advertisement insertion point describing attributes for selection of advertisements to be inserted into the video at the advertisement insertion point;
  - select, by the system, advertisements to be inserted by the client device at each of the advertisement insertion points according to the described attributes for selection of advertisements for each insertion point responsive to the client device lacking network connectivity;
  - insert the selected advertisements into the video, each selected advertisement including an advertisement tag specifying parameters relating to the display of the advertisement on the client device and the advertisement tag including instructions for the client device specifying one or more different types of user interactions with the advertisement for the client device to monitor during display of the advertisement if the advertisement is selected for display by the client device and to report monitored user interactions that occur during the display of the advertisement; and
  - provide the video to the client device, the video including the advertisement insertion points describing the attributes for selection of advertisements to be inserted into the video, the advertisements for display at the advertisement insertion points, and advertisement tags associated with the advertisements that specify the parameters related to the display of the advertisements on the client device and including the instructions for the client device specifying one or more different types of user interactions with the advertisements for the client device to monitor during display of the advertisements and to report monitored user interactions that occur during the display of the advertisements.

48. The computer-implemented method of claim 1, wherein dynamically selecting the advertisement comprises: selecting, by the client device, an advertisement having a format that the client device is capable of displaying.

* * * * *